T. SLAUGHTER.
Improvement in Railroad Rail-Joints.
No. 132,988. Patented Nov. 12, 1872.
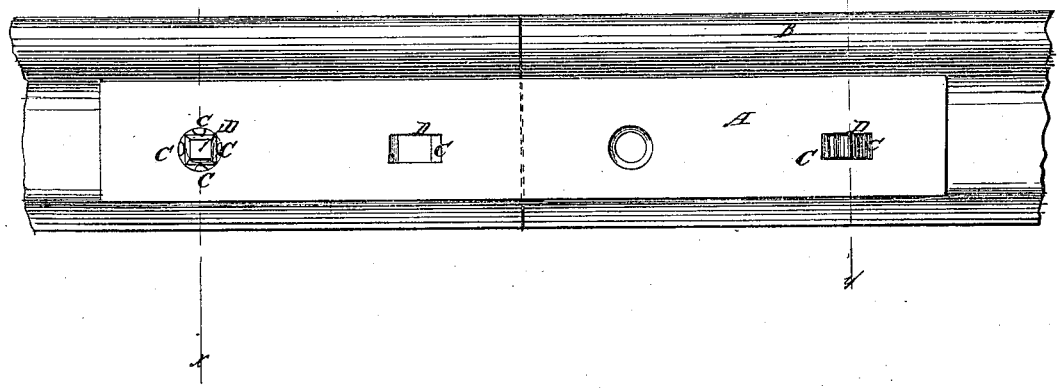
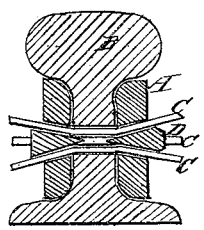
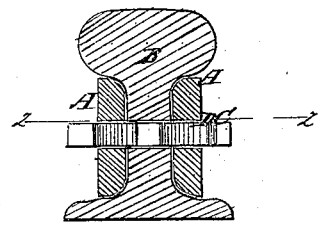
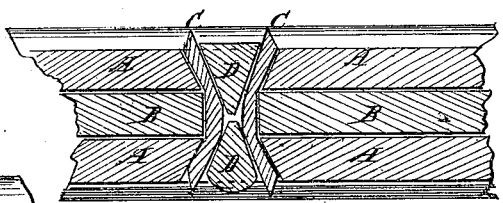
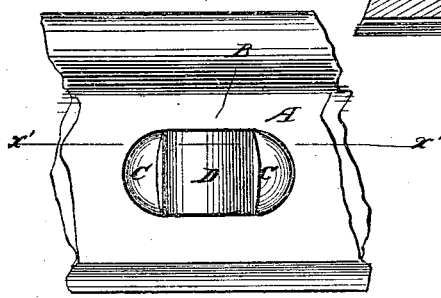
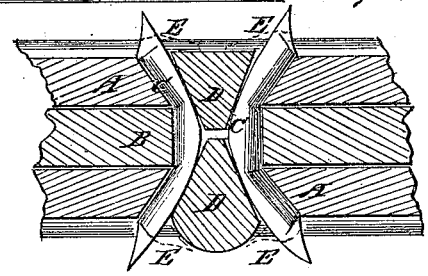
Witnesses:
P. C. Dieterich
C. Sedgwick
Inventor:
T. Slaughter
per
Attorneys.

UNITED STATES PATENT OFFICE.

THOMAS SLAUGHTER, OF LAWRENCE, MASSACHUSETTS.

IMPROVEMENT IN RAILROAD RAIL-JOINTS.

Specification forming part of Letters Patent No. 132,988, dated November 12, 1872.

*To all whom it may concern:*

Be it known that I, THOMAS SLAUGHTER, of Lawrence, in the county of Essex and State of Massachusetts, have invented a new and Improved Fastener for Rail-Joints, &c., of which the following is a specification:

For fastening two or more plates together—for instance, the fish-plates and the rails of a railway joint—I propose, as a simple, cheap, and reliable substitute for the bolts and nuts commonly used, to use gibs and keys, with holes in the outside plates, or the outer ends of the holes, when two plates only are to be fastened, conical or tapering from the outside inward; one, two, or more gibs being used, according to the shape of the hole, the wedges being driven so as to bend the gibs against the tapering walls of the hole, one being driven in at each side, and the projecting ends of the gibs being bent around against the ends of the keys to prevent them from working out, all as hereinafter described.

Figure 1 is a side elevation of a railway joint secured by my improved fastening; Fig. 2 is a section on the line $x\ x$ of Fig. 1; Fig. 3 is a section on the line $y\ y$; Fig. 4 is a horizontal section taken on the line $z\ z$ of Fig 3; Fig. 5 is an enlarged section of the joint (Fig. 1) in side elevation; and Fig. 6 is a horizontal section of Fig. 5 on the line $x'\ x'$.

Similar letters of reference indicate corresponding parts.

A represents the fish-plates, and B the rails. The holes through the fish-plates may be round, oval, rectangular, or in any approved form, provided they contract or taper from the outside inward on one, or more, or all sides. C represents the gibs, which consist of straight pieces of iron, somewhat longer than the thickness of the plate to be fastened, shaped on one side to correspond with the shape of one side of the hole. They are passed through the hole and project at each end, as shown in the drawing, one, two, or more being used, according to the nature or form of the hole. D represents the keys or wedges, of which there are two in each case, driven in from the opposite sides, as shown. E represents, in dotted lines, the projecting ends of the gibs bent around against the heads of the keys, to hold them against working out after being driven in.

I propose to fasten two or more plates of any kind by this method, which is applicable to the fastening of any plates, as well as the fish-plates of railway joints—for instance, the coupling plates or disks of shafts—may be fastened in this manner, and many others.

This kind of fastening will afford the requisite strength with elongated or slotted holes in the rails, and thus save the weakening of them as much as is necessary when round bolts are used, requiring round holes.

Having thus described my invention, I claim as new and desire to secure by Letters Patent—

The improved fastening for railway joint and other plates, consisting of the tapered holes converging from the outside of each outside plate, the gib C and keys D, the ends of the gib being bent over the ends of the keys after they are driven into the holes to wedge the gibs tight, all substantially as specified.

THOMAS SLAUGHTER.

Witnesses:
  WM. K. MASON,
  R. C. REYNOLDS.